US011399206B2

(12) United States Patent
Reddy et al.

(10) Patent No.: US 11,399,206 B2
(45) Date of Patent: *Jul. 26, 2022

(54) METHOD FOR RECEIVING A TELEVISION SIGNAL

(71) Applicant: Entropic Communications, LLC, Carlsbad, CA (US)

(72) Inventors: Madhukar Reddy, Carlsbad, CA (US); Curtis Ling, Carlsbad, CA (US); Tim Gallagher, Carlsbad, CA (US)

(73) Assignee: ENTROPIC COMMUNICATIONS, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,462

(22) Filed: Jan. 28, 2022

(65) Prior Publication Data

US 2022/0159332 A1 May 19, 2022

Related U.S. Application Data

(63) Continuation of application No. 17/217,244, filed on Mar. 30, 2021, now abandoned, which is a
(Continued)

(51) Int. Cl.
*H04B 1/00* (2006.01)
*H04N 21/41* (2011.01)
(Continued)

(52) U.S. Cl.
CPC ....... *H04N 21/4263* (2013.01); *H04B 1/0014* (2013.01); *H04N 5/455* (2013.01);
(Continued)

(58) Field of Classification Search
CPC ...... H04N 5/455; H04N 5/50; H04N 21/4382; H04N 21/4383; H04N 21/454;
(Continued)

(56) References Cited

U.S. PATENT DOCUMENTS 5,280,636 A 1/1994 Kelley et al.
5,590,156 A 12/1996 Carney
(Continued)

FOREIGN PATENT DOCUMENTS

EP  2087623 A2  8/2009
WO  WO-9748196 A1 * 12/1997 ....... H04B 10/25753
WO  WO-02087230 A1 * 10/2002 ......... H04N 21/4384

OTHER PUBLICATIONS

Jeffrey A. Weldon, et al. A 1.75-GHz Highly Integrated Narrow-Band CMOS Transmitter With Harmonic-Rejection Mixers, IEEE Journal of Solid-State Circuits, Dec. 2001, pp. 2003-2015, vol. 36, No. 12, Seattle, Washington.
(Continued)

*Primary Examiner* — Blane J Jackson
(74) *Attorney, Agent, or Firm* — McAndrews, Held & Malloy, Ltd.

(57) ABSTRACT

A wideband receiver system comprises a wideband analog-to-digital converter (ADC) module and a digital frontend (DFE) module. The wideband ADC is configured to concurrently digitize a band of frequencies comprising a plurality of desired channels and a plurality of undesired channels. The DFE module is coupled to the digital in-phase and quadrature signals. The DFE module is configured to select the plurality of desired channels from the digitized band of frequencies, and generate an intermediate frequency (IF) signal comprising the selected plurality of desired channels and having a bandwidth that is less than a bandwidth of the band of frequencies, where the generation comprises frequency shifting of the selected plurality of desired channels. The IF signal may be a digital signal and the DFE is configured to output the IF signal via a serial or parallel interface.

76 Claims, 10 Drawing Sheets

Related U.S. Application Data continuation of application No. 16/430,506, filed on Jun. 4, 2019, now Pat. No. 10,972,781, which is a continuation of application No. 15/792,318, filed on Oct. 24, 2017, now Pat. No. 10,313,733, which is a continuation of application No. 14/948,881, filed on Nov. 23, 2015, now Pat. No. 9,819,992, which is a continuation of application No. 14/617,973, filed on Feb. 10, 2015, now Pat. No. 9,210,363, which is a continuation of application No. 13/962,871, filed on Aug. 8, 2013, now Pat. No. 9,100,622, which is a continuation of application No. 12/762,900, filed on Apr. 19, 2010, now Pat. No. 8,526,898.

(60) Provisional application No. 61/170,526, filed on Apr. 17, 2009.

(51) Int. Cl.
| | | |
|---|---|---|
| *H04B 1/16* | (2006.01) | |
| *H04N 21/426* | (2011.01) | |
| *H04N 5/50* | (2006.01) | |
| *H04N 21/438* | (2011.01) | |
| *H04N 21/454* | (2011.01) | |
| *H04N 21/61* | (2011.01) | |
| *H04N 5/455* | (2006.01) | |

(52) U.S. Cl.
CPC ........... *H04N 5/50* (2013.01); *H04N 21/4382* (2013.01); *H04N 21/4383* (2013.01); *H04N 21/454* (2013.01); *H04N 21/6143* (2013.01); *H04N 21/6193* (2013.01)

(58) Field of Classification Search
CPC .. H04N 21/6143; H04N 21/6193; H04B 1/16; H04B 1/0014
See application file for complete search history.

(56) References Cited

U.S. PATENT DOCUMENTS

| | | | |
|---|---|---|---|
| 5,705,949 A | 1/1998 | Alelyunas et al. | |
| 5,768,268 A | 6/1998 | Kline et al. | |
| 6,253,094 B1 | 6/2001 | Schmutz | |
| 6,262,981 B1 | 7/2001 | Schmutz | |
| 6,282,184 B1 | 8/2001 | Lehman et al. | |
| 6,735,421 B1 | 5/2004 | Claxton et al. | |
| 6,760,342 B1 * | 7/2004 | Skones | H04B 1/28 370/437 |
| 6,906,498 B2 | 6/2005 | Breuch et al. | |
| 6,920,185 B2 | 7/2005 | Hinson | |
| 6,992,855 B2 | 1/2006 | Ehrlich | |
| 7,095,454 B2 | 8/2006 | Waight et al. | |
| 7,130,576 B1 | 10/2006 | Gurantz et al. | |
| 7,145,972 B2 * | 12/2006 | Kumar | H04L 5/06 375/349 |
| 7,167,694 B2 | 1/2007 | Khoini-Poorfard et al. | |
| 7,362,178 B2 | 4/2008 | Montemayor et al. | |
| 7,373,125 B2 | 5/2008 | Godambe et al. | |
| 7,421,259 B2 | 9/2008 | Gomez et al. | |
| 7,477,871 B1 | 1/2009 | Gurantz et al. | |
| 7,542,715 B1 | 6/2009 | Gurantz et al. | |
| 7,599,673 B2 | 10/2009 | Maxim et al. | |
| 7,783,958 B1 | 8/2010 | Eidson et al. | |
| 7,941,091 B1 | 5/2011 | Doherty et al. | |
| 8,023,912 B2 | 9/2011 | Petrovic et al. | |
| 8,086,170 B2 | 12/2011 | Petrovic et al. | |
| 8,107,916 B2 | 1/2012 | Gatta et al. | |
| 8,238,813 B1 | 8/2012 | Popoli | |
| 8,285,240 B2 | 10/2012 | Seendripu et al. | |
| 8,300,681 B2 | 10/2012 | Petrovic et al. | |
| 8,331,886 B2 | 12/2012 | Wang et al. | |
| 8,374,568 B2 | 2/2013 | Seendripu et al. | |
| 8,374,569 B2 | 2/2013 | Seendripu et al. | |
| 8,374,570 B2 | 2/2013 | Seendripu et al. | |
| 8,526,898 B2 | 9/2013 | Reddy et al. | |
| 8,566,678 B2 | 10/2013 | Eidson et al. | |
| 8,577,319 B2 | 11/2013 | Ling et al. | |
| 8,611,809 B1 | 12/2013 | Popoli | |
| 8,666,350 B2 | 3/2014 | Vauhkonen | |
| 8,892,026 B2 | 11/2014 | Petrovic et al. | |
| 8,892,225 B2 | 11/2014 | Walsh et al. | |
| 8,909,187 B2 | 12/2014 | Seendripu et al. | |
| 9,059,672 B2 | 6/2015 | Ling et al. | |
| 9,100,622 B2 | 8/2015 | Reddy et al. | |
| 9,210,362 B2 | 12/2015 | Reddy et al. | |
| 9,210,363 B2 | 12/2015 | Reddy et al. | |
| 9,219,557 B2 | 12/2015 | Bargroff et al. | |
| 9,225,373 B2 | 12/2015 | Gomez et al. | |
| 9,413,476 B2 | 8/2016 | Petrovic et al. | |
| 9,819,992 B2 | 11/2017 | Reddy et al. | |
| 9,853,757 B2 | 12/2017 | Petrovic et al. | |
| 9,942,598 B2 | 4/2018 | Reddy et al. | |
| 10,313,733 B2 | 6/2019 | Reddy et al. | |
| 10,439,746 B2 | 10/2019 | Petrovic et al. | |
| 10,972,781 B2 | 4/2021 | Reddy et al. | |
| 11,139,902 B2 | 10/2021 | Petrovic et al. | |
| 2003/0158614 A1 | 8/2003 | Friel et al. | |
| 2003/0228855 A1 | 12/2003 | Herz et al. | |
| 2004/0058661 A1 | 3/2004 | Hsu et al. | |
| 2004/0110522 A1 | 6/2004 | Reddy et al. | |
| 2005/0040909 A1 | 2/2005 | Waight et al. | |
| 2005/0286562 A1 | 12/2005 | Nakao et al. | |
| 2007/0002961 A1 | 1/2007 | Hoctor et al. | |
| 2007/0032220 A1 | 2/2007 | Feher | |
| 2007/0042742 A1 | 2/2007 | Kim et al. | |
| 2007/0111661 A1 | 5/2007 | Bargroff et al. | |
| 2007/0179649 A1 | 8/2007 | Mitsuno | |
| 2007/0263754 A1 | 11/2007 | Currivan et al. | |
| 2009/0075613 A1 | 3/2009 | Safarian et al. | |
| 2009/0258629 A1 | 10/2009 | Ritchey et al. | |
| 2011/0105068 A1 | 5/2011 | Reddy et al. | |

OTHER PUBLICATIONS

Int'l Search Report and Written Opinion Appln No. PCT/2010/031631 dated Jun. 17, 2010.
Int'l Search Report and Written Opinion Appln No. PCT/2010/031627 dated Jun. 18, 2010.

* cited by examiner

METHOD FOR RECEIVING A TELEVISION SIGNAL

PRIORITY CLAIM

This application is a continuation of U.S. patent application Ser. No. 17/217,244 filed on Mar. 30, 2021, which is a continuation of U.S. patent application Ser. No. 16/430,506 (now U.S. Pat. No. 10,972,781) filed on Jun. 4, 2019, which is a continuation of U.S. patent application Ser. No. 15/792,318 (now U.S. Pat. No. 10,313,733) filed Oct. 24, 2017, which is a continuation of U.S. patent application Ser. No. 14/948,881 (now U.S. Pat. No. 9,819,992) filed Nov. 23, 2015, which is a continuation of U.S. patent application Ser. No. 14/617,973 (now U.S. Pat. No. 9,210,363) filed on Feb. 10, 2015, which is a continuation of U.S. patent application Ser. No. 13/962,871 (now U.S. Pat. No. 9,100,622) filed on Aug. 8, 2013, which is a continuation of U.S. patent application Ser. No. 12/762,900 filed on Apr. 19, 2010 (now U.S. Pat. No. 8,526,898), which claims the benefit of priority to U.S. provisional application 61/170,526 filed Apr. 17, 2009. Each of the above referenced documents is hereby incorporated by reference in its entirety.

BACKGROUND

This invention relates to wideband receiver systems and methods having a wideband receiver that is capable of receiving multiple radio frequency channels located in a broad radio frequency spectrum. In particular, the invention relates to wideband receiver systems that are capable of receiving multiple desired television channels that extend over multiple non-contiguous portions of the broad frequency spectrum and grouping them into a contiguous, or substantially-contiguous, frequency spectrum.

Receivers used to down-convert and selectively filter TV channels are referred to as tuners, and tuners designed to concurrently receive several TV channels are referred to as wideband tuners. Existing tuners for these applications down-convert a swath of channels to an intermediate frequency, which are then sent to a demodulator. Because the swath of channels is not contiguous, this swath includes the desired channels as well as undesired channels. The demodulator employs a high-speed data converter to capture this swath of desired and undesired channels in the digital domain and subsequently filters out the desired channels.

In general, television channels broadcasted over the air or over cable networks are distributed across a broad frequency spectrum. That is, the channel frequencies may not be adjacent to each other. In certain applications such as DVR and picture-in-picture, the receiver system may have to concurrently receive several desired channels that may or may not be contiguous. The wideband receiver requirement poses a trade-off to the system to limit either the dynamic range of the wideband tuner or reduce the bandwidth covered by the tuner so that fewer channels may be received and processed by the demodulator.

FIG. 1 shows a conventional wideband tuner 100. Tuner 100 may be a direct conversion tuner and includes a low noise amplifier LNA1 having an input terminal coupled to a radio frequency (RF) input signal 102 and an output terminal coupled to a mixer M1. The RF signal may include one or more television channels receiving from a cable network via an RF connector or wirelessly via an antenna. The RF input signal may include the VHF and UHF television channels in a terrestrial television broadcasting system or the CATV channels in cable networks. In order to receive all broadcasted channels present in the RF input signal, LNA1 must necessarily have a wide tuning range, high linearity, and low noise. Mixer M1 is coupled to a synthesizer S1 that can generate an oscillator frequency located around the center of the RF signal. Mixer M1 frequency down-converts the received RF input signal to a more convenient intermediate frequency (IF) band. Tuner 100 includes an amplifier V1 having a programmable gain for amplifying the IF signal, which is then band-pass filtered by a filter F1 before outputting to a demodulator.

In general, the RF signal includes multiple desired channels that are located in non-contiguous portions of a radio frequency spectrum. As shown in FIG. 1, the swath of channels 110 occupies a bandwidth BW1 120 at an RF center frequency $f_{rfc}$ 130. Synthesizer S1 may be tuned to a frequency around the center frequency $f_{rfc}$ 130 for mixing channels 110 to an intermediate frequency $f_{ifc}$ 160, the frequency down-mixed channels 140 are amplified by amplifier V1 and then filtered by F1 to produce a swath of channels 170 centered around frequency $f_{ifc}$ 160. In an exemplary application shown in FIG. 1, bandwidth BW1 contains 10 channels. In the case where channels are TV channels that are spaced at either 6 MHz or 8 MHz in most parts of the world, bandwidth BW1 120 would span from 60-80 MHz, i.e., the down-converted bandwidth at the intermediate frequency would require a bandwidth equal to at least BW1, or at least 80 MHz when such architecture is used. It is noted that in other applications where the desired RF channels are located in the low band such as channels numbers 2 to 6 (VHF in the terrestrial TV broadcast or CATV) and in the high band such as channels numbers 14 to 83 of the UHF TV broadcast or channel numbers 63-158 of the CATV's ultra band, the bandwidth BW1 can be 800 MHz or higher. This wide bandwidth of 800 MHz would require a very expensive digital processing circuitry such as very high-speed analog to digital conversion and high-speed processor in the demodulator.

It is desirable to have wideband receiver systems that can increase the dynamic range without requiring expensive data conversion, filtering and channel selection at the demodulator.

BRIEF SUMMARY

An embodiment of the present invention includes a wideband receiver system that is configured to concurrently receive multiple radio frequency (RF) channels including a number of desired channels that are located in non-contiguous portions of a frequency spectrum and group the desired channels in a contiguous or substantially-contiguous frequency band at an intermediate frequency spectrum, where the term "substantially-contiguous" includes spacing the desired channels close to each other (e.g. as a fraction of the total system bandwidth, or relative to a channel bandwidth) but with a spacing that can be variable to accommodate the needs of overall system. The term "contiguous" heretofore encompasses "substantially-contiguous." The term "spacing" is referred to as the frequency difference between adjacent channels. The system includes a wideband receiver having a complex mixer module for down-shifting the multiple RF channels and transforming them to an in-phase signal and a quadrature signal in the baseband or low intermediate frequency (IF) band. The system further includes a wideband analog-to-digital converter module that digitizes the in-phase and quadrature signals. The digital in-phase and quadrature signals are provided to a digital frontend module that contains a bank of complex mixers that frequency-shift the number of desired channels to a baseband where the desired channels are individually filtered.

The digital frontend module may also include a decimator module that decimates the desired RF channels by a factor M before demodulating them to a digital data stream.

In certain embodiments of the present invention, the wideband receiver system additionally includes an up-converter module having multiple complex up-mixers, each of the complex up-mixers is configured to frequency up-shift each one of the desired RF channels to a sub-portion of an IF spectrum, wherein all sub-portions of the desired channels are adjacent to each another and form a contiguous frequency band in the IF spectrum. The act of frequency shifting the desired channels to the IF spectrum allows the wideband receiver system to directly interface with commercially available demodulators. Allowing the spacing of the desired channels in the contiguous spectrum to be variable allows a system to optimize placement of these desired channels for the purposes of avoiding sensitive portions of the spectrum which may either be vulnerable to spurious signals and interference; or which may generate interference directly or as a harmonic product, to other systems.

In another embodiment of the present invention, a multi-tuner receiver system having two or more tuners is provided to receive multiple desired RF channels that extend over several non-contiguous sub-portions of a broad frequency spectrum and group them into a contiguous frequency spectrum. The multi-tuner system includes at least a first tuner that processes a first sub-portion of the broad frequency spectrum into a first in-phase signal and a first quadrature signal and a second tuner that processes a second sub-portion of the broad frequency spectrum into a second in-phase signal and a second quadrature signal. The multi-tuner receiver system further includes a first analog-to-digital converter module that digitizes the first in-phase and quadrature signals and a second analog-to-digital converter module that digitizes the second in-phase and quadrature signals. In addition, the multi-tuner system includes a first digital frontend module having a first number of complex mixers corresponding to a first number of the desired RF channels located in the first sub-portion of the broad frequency spectrum and a second digital frontend module having a second number of complex mixers corresponding to a second number of the desired RF channels located in the second sub-portion of the broad frequency spectrum. The first digital frontend module frequency shifts the first number of the desired RF channels to a first plurality of baseband signals and the second digital frontend module frequency shifts the second number of the desired RF channels to a second plurality of baseband signals.

The multi-tuner system further includes a first up-converter module having a plurality of N complex mixers, wherein N is an integer value equal to the number of desired channel. The first up-converter module frequency up-shifts the first plurality of the baseband signals to a first portion of an intermediate frequency. In addition, the multi-tuner system includes a second up-converter module that frequency up-shifts the second plurality of the baseband signals to a second portion of an intermediate frequency. The first and the second portions of the intermediate frequency are non-overlapping and located adjacent to each other to form a contiguous intermediate frequency (IF) band. The multi-tuner system further includes a digital-to-analog converter that converts the contiguous IF band to an analog waveform signal.

DETAILED DESCRIPTION

Figure 1:
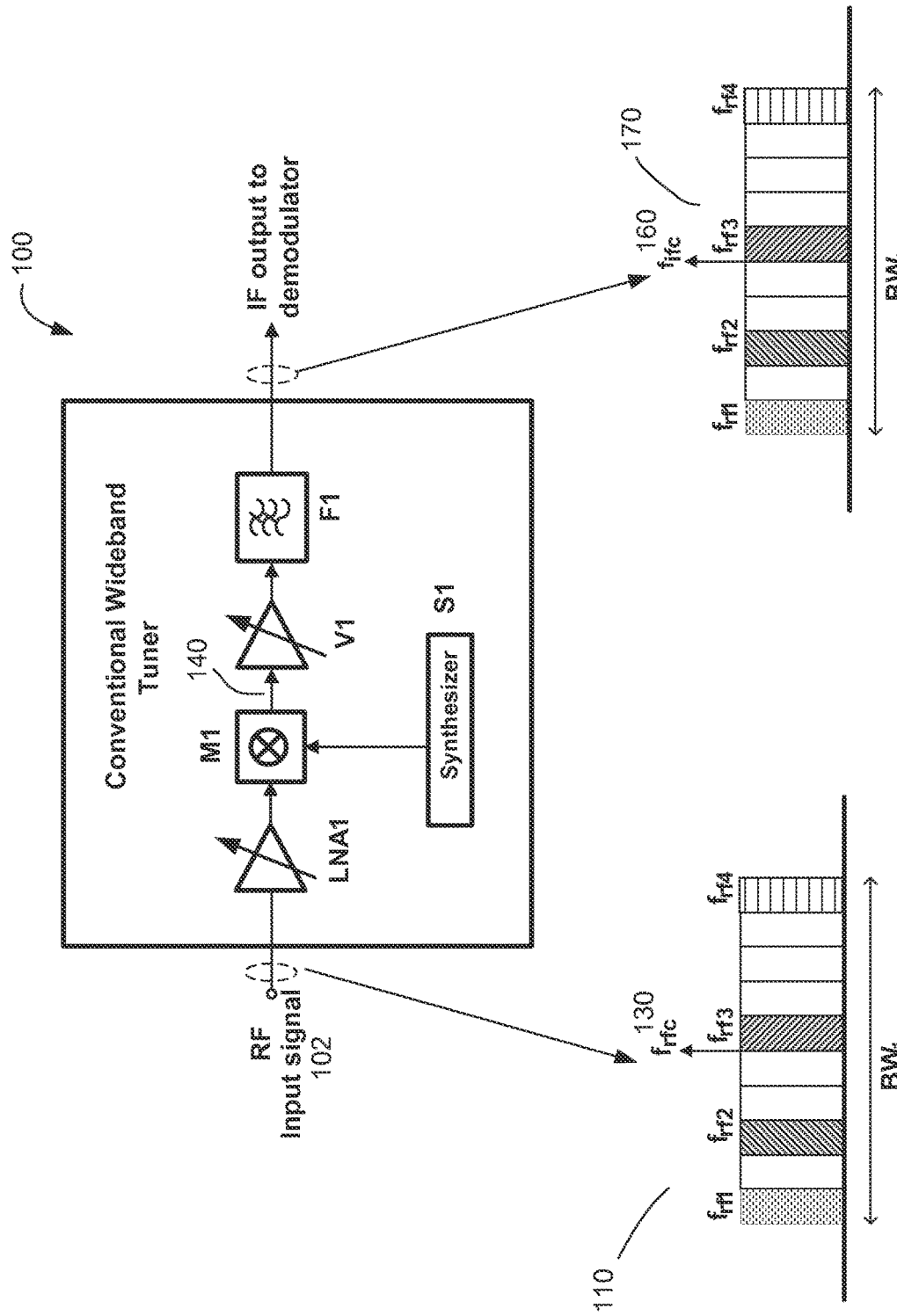
FIG. 1 is a schematic block diagram of a conventional wideband tuner.
Figure 2:
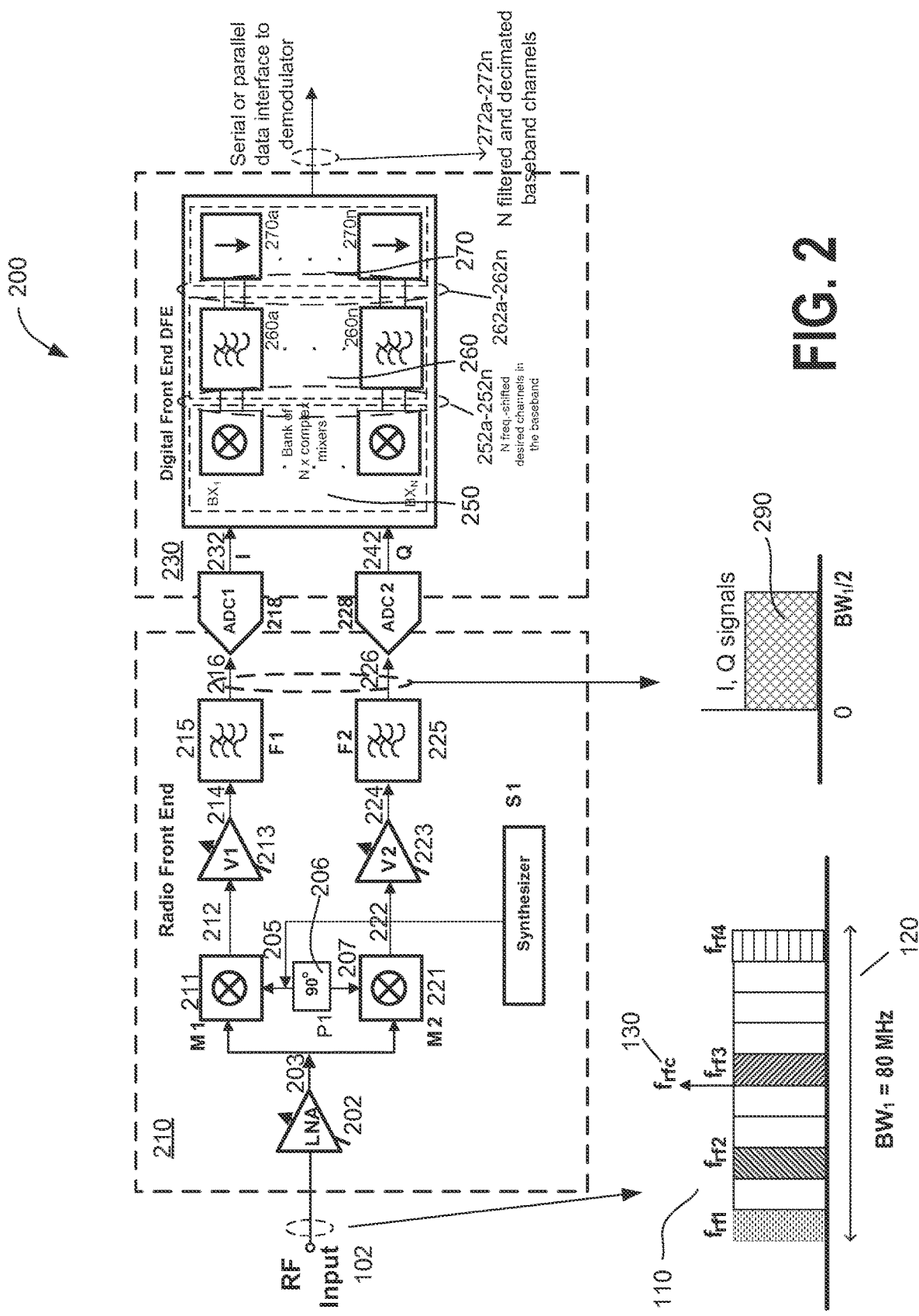
FIG. 2 is a schematic block diagram of a wideband receiver system according to an embodiment of the present invention.

FIG. 2 is a schematic block diagram of a wideband receiver system 200 according to an embodiment of the present invention. Wideband receiver system 200 includes a radio front end 210 and a digital front end 230. Radio front end 210 may be a single very wide-band tuner receiver that captures the desired swath of channels located in non-contiguous portions of the spectrum having a frequency bandwidth BW1 120. In this example, the number of available channels in BW1 120 is assumed to be 10 with each channel occupying an 8 MHz bandwidth for a total of 80 MHz. Radio front end 210 is shown as including a low noise amplifier LNA 202 having an input terminal configured to receive an RF input signal 102. In the example shown, RF signal 102 includes four desired RF channels having the respective carrier frequency $f_{rf1}$, $f_{rf2}$, $f_{rf3}$, and $f_{rf4}$ that are located in non-contiguous portions of the wide frequency spectrum BW1. It is understood, however, that spectrum BW1 120 may have any other number of desired frequencies that are not contiguous. LNA 202 has a very low noise figure and very high linearity and a wide tuning range (i.e., very high IIP2 and IIP3 intercept points) to maximize a signal-to-noise-and distortion ratio (SNDR) at the amplifier output. LNA 202 may have a programmable gain to amplify RF signal 102 to adequate voltage levels for mixers M1 211 and M2 221.

Mixers M1 211 and M2 221 may be conventional mixers formed using, for example, differential Gilbert cells. Each of the mixers 211 and 221 multiplies (mixes) an amplified RF signal 203 with a respective first oscillator frequency signal 205 and a second oscillator frequency signal 207 to generate an in-phase signal 212 and a quadrature signal 222 that have a phase shift of 90° degree between them. Mixers 211 and 221 are identical so that the amplitude of the in-phase signal 212 and quadrature signal 222 are the same. The first and second oscillator frequencies 205 and 207 are identical and have a 90° degree phase shift generated through a 90° degree phase shifter P1 206. Synthesizer S1 may be a single local oscillator operable to generate the oscillator frequency 205 for converting the receive RF signal 102 to a zero-IF or low-IF band. Synthesizer S1 can be a coarse (large step) phase locked loop. Synthesizer S1 can also be programmable to cover the wideband frequency of the analog and digital terrestrial broadcast and/or the cable television system. The RF signal 102 may have relatively uniform signal strength in a cable network. However, its signal strength may extend in several orders of magnitude in a terrestrial broadcast system, thus, LNA 202 and/or mixers M1 211, M2 221 are required to have a relatively high dynamic range to handle the large variations in the signal strength.

In-phase signal 212 and quadrature signal 222 are further amplified and filtered by respective amplifiers V1 213, V2 223 and filters F1 215, F2 225 to generate a filtered in-phase signal 216 and a filtered quadrature signal 226. Filters F1 215 and F2 225 may be passive or active low-pass filters to filter out any unwanted frequency components of the signals 214 and 224 before digitizing them for further processing in digital front end 230. It is understood that the in-phase path 216 and the quadrature path 226 must have the same amplitude spectrum and maintain a fixed phase relationship, i.e., amplifiers V1 213, V2 223 and filters F1 215, F2 225 must be substantially identical. Because the two paths 216 and 226 are in quadrature, the spectral components from both positive and negative frequencies can be overlaid so that the bandwidth (cutoff frequency) of filters F1 215 and F2 225 can be one half of the BW1 bandwidth 120.

Analog-to-digital converters ADC1 218 and ADC2 228 are high-speed (i.e., high sampling rate) converters to maximize the dynamic range. In an exemplary application, radio front end 210 operates as a nominal zero-IF down-mixer so that signals 216 and 226 have a nominal bandwidth 290 equal to one half of the RF signal bandwidth BW1 thanks to the complex down-mixer architecture. In other embodiment, radio front end 210 operates as a low-IF down-mixer so that the nominal bandwidth 290 of signals 216 and 226 is greater than one half of the bandwidth BW1. In practice, the sampling rate of ADC1 218 and ADC2 228 is chosen to be higher than the Nyquist sampling requirement, i.e., the filtered analog quadrature signals 216 and 226 may be over-sampled in order to reduce or avoid aliasing of undesired signals into the digitized I and Q signals.

ADC1 218 generates a digital signal I 232 that is a digital representation of the analog filtered signal 216; ADC2 228 generates a digital signal Q 242 that is a digital representation of the analog filtered signal 226. Digital signals I 232 and Q 242 are then applied to a bank of N complex mixers 250, wherein N is an integer value corresponding to the number of desired RF channels located in the non-contiguous portions of the frequency spectrum BW1. It is understood that the number N can be any integer value. In one embodiment, N can be equal to the number of all available channels that exist in the licensed frequency spectrum to provide system flexibility. In other embodiments, N can be equal to the number of all receivable channels within a geographic area. In yet another embodiment, N can be an integer value less than the number of receivable channels with the geographic area to reduce system costs. In the exemplary embodiment shown in FIG. 2, the number of desired channels is 4. That is, each of the 4 complex mixers 250 mixes in-phase and quadrature signals 232 and 242 with an associated frequency to generate a corresponding baseband, which is then individually filtered, decimated and provided to an associated demodulator.

Each of the N complex mixers 250 receives the digital signals I 232 and Q 242 from ADCs 218 and 228 to extract a different one of the desired channels and frequency-shifts the extracted signals to the baseband frequency. Each of the frequency shifted desired channels 252 is filtered by an associated filter module (identified as 260a to 260n). In an embodiment, each of the filtered signals 260a to 260n may be sent directly to an associated demodulator (identified as 270a to 270n) for extracting the original information transmitted in the associated desired channel. In another embodiment, each of the filtered signals 262a to 262n is further decimated before providing to a demodulator. A path of digital front end 230 is described in more detail below.

Figure 3:
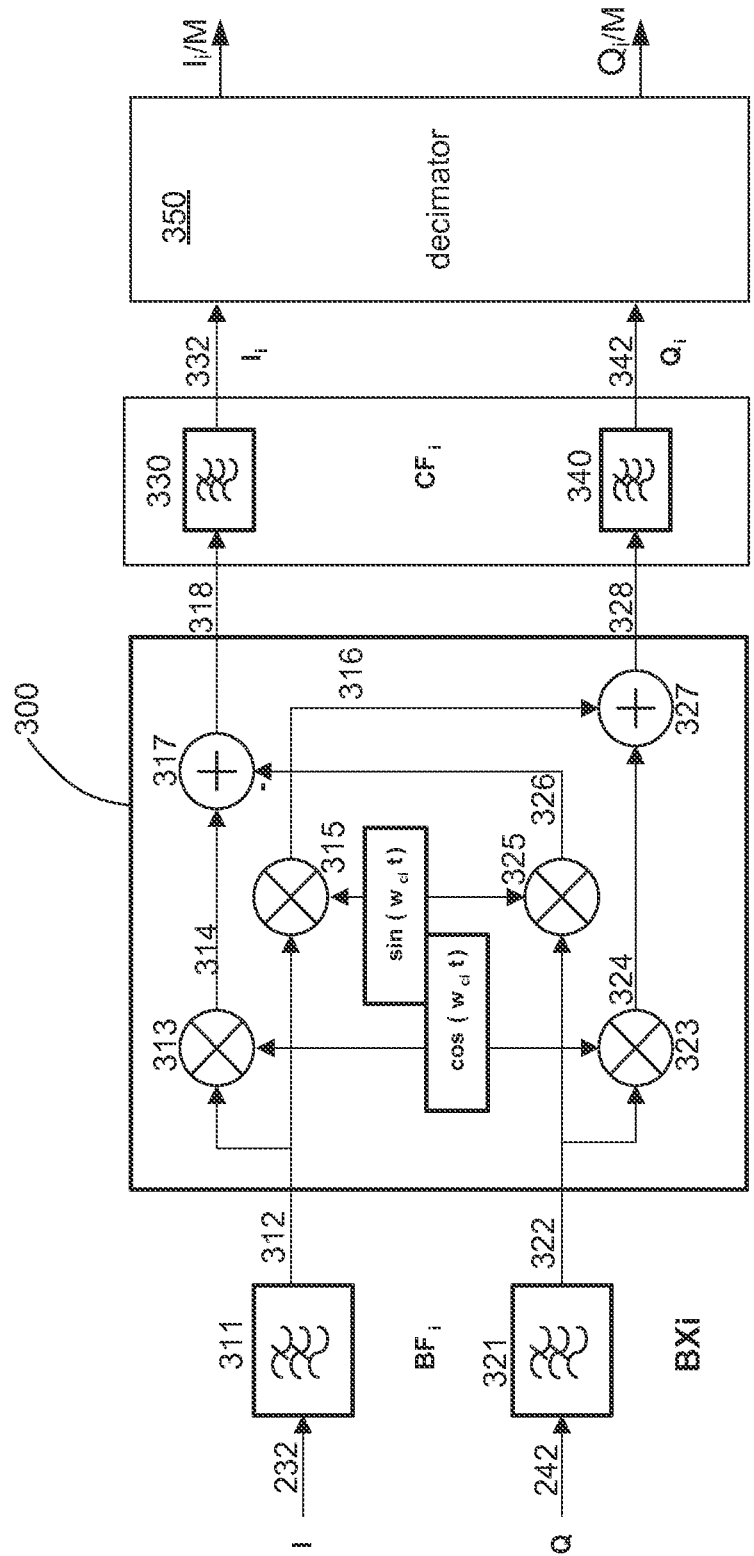
FIG. 3 is a simplified circuit diagram of a complex down-mixer according to an embodiment of the present invention.

FIG. 3 is a simplified circuit diagram of one of the signal paths 272a to 272n of digital front end 230 shown in FIG. 2 according to an embodiment of the present invention. In an embodiment, digital signal I 232 may be further filtered by a filter 311 to obtain a filtered signal 312. Similarly, digital signal Q 242 may be further filtered by a filter 321 to obtain a filtered signal 322. Thus, digital signals 312 and 322 only contain low-frequency components with undesired high-frequency components being eliminated by respective filters 311 and 321. It is noted that filtered signals 312 and 322 are interposed between the respective ADCs 218, 228 and the bank of N complex mixers 250.

Mixer 300, which represents one of the N complex mixers 250, includes four multipliers 313, 315, 323, and 325. Multipliers 313 and 315 multiply the filtered signal 312 with respective $\cos(\omega_{ci}t)$ and $\sin(\omega_{ci}t)$ signals and generate respective products 314 and 316. Similarly, multipliers 323 and 325 multiply the filtered Q signal 322 with respective $\cos(\omega_{ci}t)$ and $\sin(\omega_{ci}t)$ signals and generate respective products 324 and 326. An adder 317 sums the products 314 and 326 to generate a frequency-shifted signal I 318. An adder 327 sums the products 324 and 316 to generate a frequency-shifted signal Q 328. Basically, complex mixer 300 causes a frequency shift of the filtered components 312 and 322 to respective baseband signals 318 and 328 in the digital domain according to the operation:

$$Y(t) = X(t) * e^{-j\omega_c t} \tag{1}$$

or taken the Fourier transform, we obtain:

$$Y(\omega) = X(\omega - \omega_c) \tag{2}$$

Multipliers 313, 315, 323, and 325 are identical digital multipliers. In an embodiment, a numerically controlled oscillator with quadrature output generates the $\cos(\omega_{ci}t)$ and $\sin(\omega_{ci}t)$ signals. Numerically controlled oscillators (NCO) can be implemented using a phase accumulator and a look-up table. NCOs are known to those of skill in the art and will not be described herein. The frequency $\omega_{ci}$ is so chosen that each one of the desired channels embedded in the digital signals I 232 and Q 242 will be downshifted to the baseband. In the given example shown in FIG. 2, the bank of N complex mixers will have four complex mixers, each one of the N (i.e., four) complex mixers is coupled to an individual NCO having a distinct frequency $\omega_{ci}$ so that when mixing the filtered digital I and Q signals 312 and 322 with that frequency, each one of the complex mixers will generate the signals I (318) and Q (328) of a corresponding one of the desired channels at the baseband.

In an embodiment, baseband signals 318 and 328 are further individually filtered by respective filters 330 and 340 that are identified as one of the filters 260a-n in FIG. 2. Filters 330 and 340 may be band-pass or low-pass filters having a narrow bandwidth equal to the bandwidth of a desired channel. In certain embodiments, filters 330 and 340 can be analog passive or active low-pass or complex bandpass filters such as polyphase filters. In another embodiment, filters 330 and 340 can be digital low-pass filters, such as finite impulse response (FIR) filters to eliminate high frequency components that may be aliased back to the baseband signals Ii (332) and Qi (342) when decimated by subsequent decimator 350.

The reduced sampling rate of the N desired baseband channels will be sent as a serial or parallel digital data stream to a demodulator using a serial or parallel data interface according to commonly known methods, as shown in FIG. 2. This approach provides several advantages over conventional tuner architectures. First, it eliminates the need of expensive data conversion, filtering and channel selection on the demodulator side. Second, it removes undesired channels from the signal path at an early stage, thus relieves the large dynamic range requirement in the demodulator.

Figure 4:
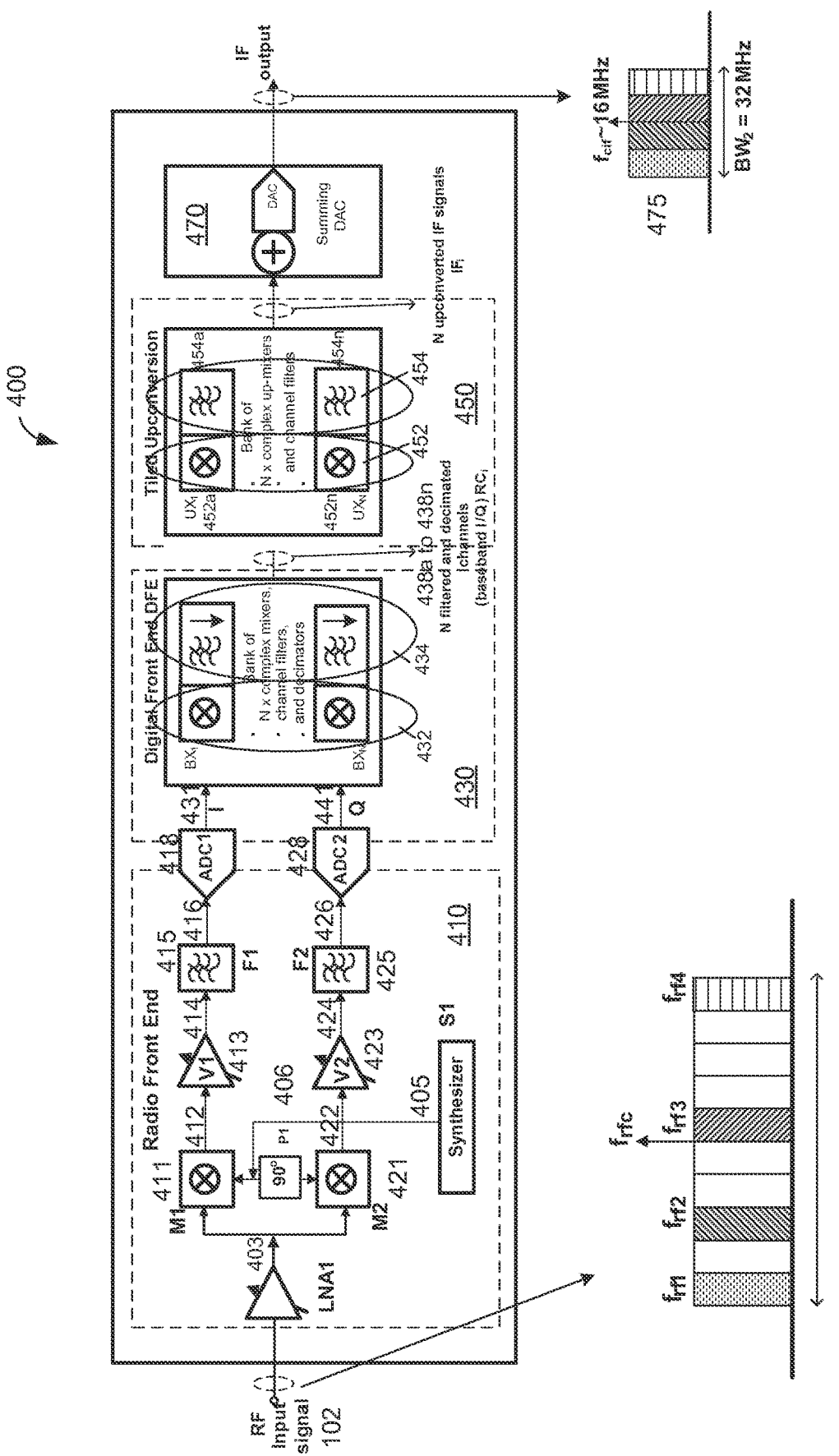
FIG. 4 is a simplified schematic block diagram of a wideband receiver system according to another embodiment of the present invention.

FIG. 4 shows a simplified schematic block diagram of a wideband receiver system 400 according to another embodiment of the present invention. Wideband receiver system 400 includes a radio front end 410, a digital front end 430, a tiled up-conversion module 450, and a summing digital-to-analog converter module DAC 470. Radio front end 410 includes a low noise amplifier LNA1 that receives an RF input signal 102 and provides an amplified RF signal 403 to mixers M1 411 and M2 421. Mixer M1 411 is coupled to an oscillator frequency 405 of a synthesizer S1 whereas mixer M2 421 is coupled with the oscillator frequency 405 via a phase shifter P1 406 that generates a 90° degree phase-shift to the oscillator frequency 405. Mixers M1 411 and M2 421 generate respective in-phase signal 412 and quadrature signal 422 that are further amplified by respective amplifiers V1 413 and V2 423. The amplified in-phase and quadrature signals 414, 424 are then filtered by filters F1 415 and F2 425 to eliminate undesired frequency components that would be aliased back to the in-phase and quadrature signals when digitally sampled by subsequent analog-to-digital converters ADC1 418 and ADC2 428. Digital signals I 422 and Q 442 at the input of digital front end 430 are digital representations of the filtered analog in-phase and quadrature signals 416, 426 before the ADCs. Digital front end 430 include a bank of N complex mixers 432 comprising 432a to 432n identical mixers, where N is an integer value corresponding to the number of the desired channels located in non-contiguous portions of the frequency spectrum. Each of the N complex mixers 432a to 432n frequency down-converts signals I 432 and Q 442 to an associated baseband. Each of the frequency down-converted I and Q signals are coupled to respective low-pass, band-pass, or decimating filters 434. In this regard, the radio front end 410 and the digital front end 430 are similar to respective radio front end 210 and digital front end 230 of FIG. 2 that have been described in detail above.

In an alternative embodiment of the present invention, the N filtered and decimated channels 438a to 438n (where indices a to n correspond to the associated number of desired channels) are not provided to a demodulator for demodulation. Instead, the N filtered and decimated channels 438a to 438n are further frequency up-converted to an intermediate frequency (IF) spectrum. In order to achieve that, the N filtered and decimated channels are coupled to a tiled up-conversion module 450 that includes a bank of N complex up-mixers, where N is an integer value correspond to the number of desired received channels. The N complex up-mixers include identical digital mixers 452a to 452n that will be described further in detail below with reference to FIG. 5. The N up-shifted channels are then filtered by a subsequent bank of channel filters 454 that, in an embodiment, comprises N individual finite impulse response (FIR) filters. The N filtered channels are then digitally combined and converted to the analog domain by a summing digital-to-analog converter module DAC 470. The N up-shifted channels are adjacent to each other and form a contiguous or substantially-contiguous set of channels 475 in the IF spectrum centered around $f_{if}$ as illustrated in FIG. 4. In an embodiment, the spectra of the mixed products are spaced in such a way so as to avoid overlap with known frequency bands containing potential or actual interferers. In another embodiment, the spectra of the mixed products are spaced in such a way so as to avoid overlap with frequency bands that might introduce interference to other systems. In general, because the bandwidth $BW_2$ is substantially lower than $BW_1$, the IF frequency $f_{if}$ can be set proportionally lower, e.g., typically about 16 MHz to accommodate the spectrum of BW2 of up to 32 MHz (corresponding to the total bandwidth of the four desired channels, each having a bandwidth of 8 MHz in this example).

The up-conversion approach of FIG. 4 provides several advantages over conventional tuner architectures. First, it allows the demodulator to operate the data converter at a lower data rate and with lower resolution (fewer bits) due to the fact that the contiguous channels have a narrower bandwidth. Second, the up-conversion approach provides full compatibility with existing demodulators that require an analog IF signal. Third, it removes undesired channels from the signal path at an early stage, thus relieves the requirement of a high dynamic range requirement of the demodulator's analog-to-digital converter and the demodulator itself.

Figure 5:
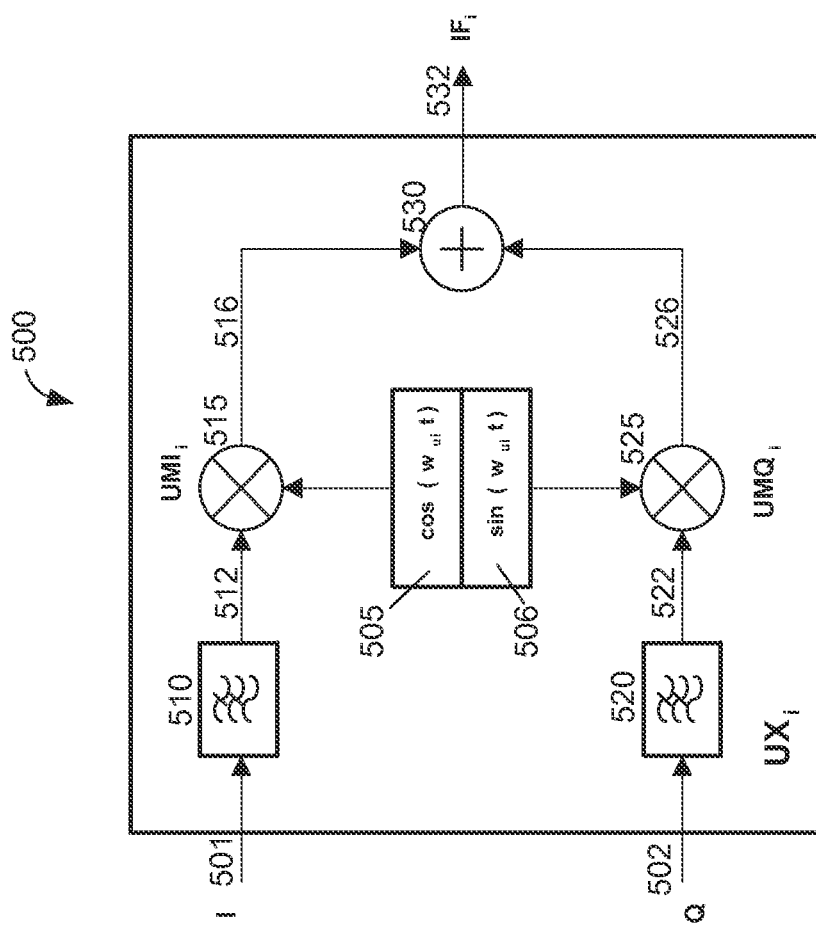
FIG. 5 is a simplified circuit diagram of a complex up-mixer according to an embodiment of the present invention.

FIG. 5 shows a simplified exemplary circuit diagram of a complex up-mixer 500 according to an embodiment of the present invention. Up-mixer 500 is one of the N complex up-mixers 452a to 452n in tiled up-conversion module 450 shown in FIG. 4. Up-mixer 500 includes filter 510 and 520 configured to eliminate unwanted frequency components present in respective input signals I 501 and Q 502. Filtered signals 512 and 522 are provided to up-mixers UMI 515 and UMQ 525 that multiply the filtered signals 512 and 522 with respective $\cos(\omega_{if}t)$ and $\sin(\omega_{if}t)$. The products 516 and 526 are summed in an adder 530 to generate an IF signal 532 according to the following equation:

$$IF(t)=I(t)*\cos(\omega_{if}t)+Q(t)*\sin(\omega_{if}t) \quad (3)$$

Up-mixers UMI 515 and UMQ 525 are identical digital multipliers that multiply the respective filtered signal 512 and 522 with a cosine function 505 and a sine function 506 that can be generated from a NCO using a digital phase accumulator and a look-up table.

As described above, TV channels are grouped into multiple frequency bands in North America. For example, channels 2 through 6 are grouped in VHF-low band (aka band I in Europe), channels 7 through 13 in VHF-high band (band III), and channels 14 through 69 in UHF band (bands IV and V). In order to receive such a wide frequency spectrum, the low noise amplifier and mixer must have very low noise, wide tuning range and high linearity as described above in the wideband receiver systems 200 and 400. However, a wideband receiver having a single tuner with high sensitivity may have a high power consumption. For certain applications, it may be advantageous to use multiple tuners that are optimized for a given frequency band, such as a dedicated tuner for the low VHF band, another dedicated tuner for the high VHF band and the UHF band, and yet other dedicated tuners for receiving the digital video broadcasting (DVB) via satellite (DVB-S), via cable (DVB-C), or terrestrial digital video broadcasting (DVB-T). The multi-tuner approach may also be advantageously applied to cable networks that carry TV programs on an 88 MHz to 860 MHz according to the Data Over Cable Service Interface Specification (DOCSIS) protocol.

Figure 6:
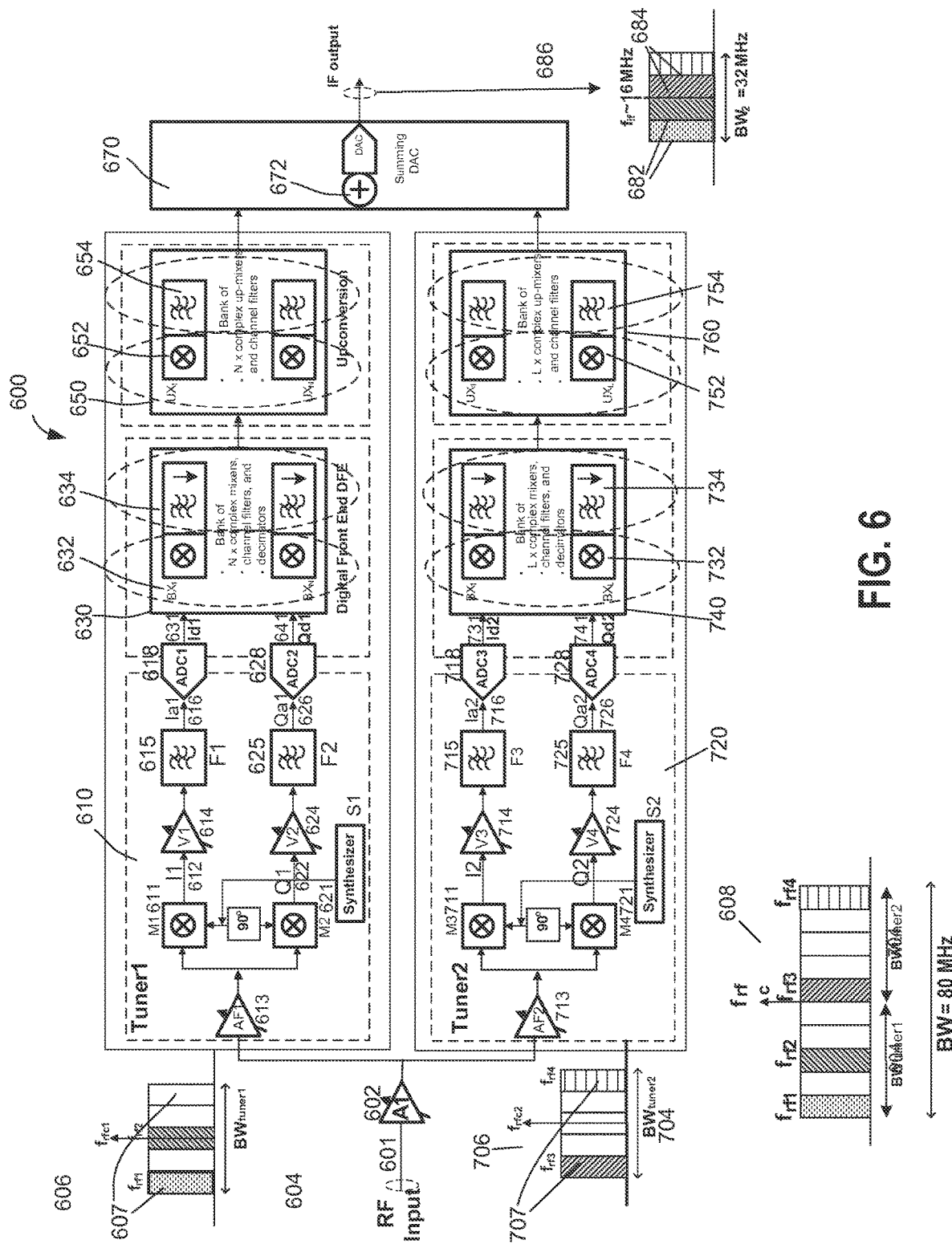
FIG. 6 is a simplified schematic block diagram of a wideband multi-tuner receiver system according to an embodiment of the present invention.

FIG. 6 shows a simplified schematic block diagram of a wideband multi-tuner receiver system 600 according to an embodiment of the present invention. In an embodiment, multi-tuner system 600 includes low noise amplifier A1 602 for receiving an RF input signal 601. Amplifier A1 602 is coupled to at least a tuner1 610 and a tuner2 720. In another embodiment, multi-tuner system 600 may not include amplifier 602 so that RF input signal 601 can be received directly at each tuner 610 and 720.

Tuner1 610 includes an amplifying filter AF1 613 that filters and amplifies a first portion BWtuner1 604 of a broad frequency spectrum 608 that contains a first plurality of RF channels 606 including desired channels 607 having respective channel frequencies $f_{rf1}$ and $f_{rf2}$. The first portion of the broad frequency spectrum BWtuner1 604 is then frequency down-converted to a low-IF or zero-IF in-phase signal I1 612 and a quadrature signal Q1 622 through respective mixer M1 611 and M2 621. Signals I1 612 and Q1 622 are further amplified and low-pass filtered before applying to respective analog-to-digital converters ADC1 618 and ADC2 628 that convert analog signals Ia1 616 and Qa1 626 to respective digital in-phase signal Id1 631 and digital quadrature signal Qd1 641. Because tuner1 610 only covers a portion BWtuner1 604 of the entire frequency spectrum 608 having fewer channels, the ADC1 618 and ADC2 628 can be slower-speed analog-to-digital converters with a large number of bits, i.e., large dynamic range.

Digital signals Id1 631 and Qd1 641 are then provided to a digital front end DFE 630 that includes a first bank of N complex mixers 632 and channel and decimating filters 634. The first bank of N complex filters 632 has N identical complex mixers, where N is an integer value equal to the number of desired channels located in the first portion BWtuner1 604 of the broad frequency spectrum 608. In an embodiment, each one of the first bank of N complex mixers includes four digital mixers that multiply digital stream Id1 631 and Qd1 641 with respective digitized cosine function and sine function to generate the sum and difference frequency components, as shown in FIG. 3. The digitized cosine and sine frequency, i.e., the mixer frequency is so chosen so that when mixing signals Id1 631 and Qd1 641 will move them to a baseband or a low-IF band. In an embodiment, channel and decimating filters have similar structures as filters 330 and 340 and demodulator 350 as shown in FIG. 3. That is, channel and decimating filters include digital low-pass filters 330 and 340 that eliminates unwanted high frequency components of the baseband signals I and Q prior to applying them to a decimator 350 (FIG. 3) that reduces the sample frequency without any loss of information since Id1 631 and Qd1 641 are sampled at a much higher frequency by the respective ADC1 618 and ADC2 628.

The decimated desired channels are then provided to an up-converter module 650 that includes a bank of N up-mixers. The bank of N up-mixers includes N identical up-mixers whose structure is shown in FIG. 5. In an embodiment, N is an integer value equal to the number of desired channels present in BWtuner1 604. Each one of the up-mixer frequency-shifts the baseband signals I and Q of each one of the desired channels to an appropriate portion of the intermediate frequency band according to Equation (3). In other words, the bank of N up-mixers is "frequency multiplexing" the desired channels onto a first portion 682 of an IF band 686.

Similarly, tuner2 720 includes an amplifying filter AF2 713 that is configured to receive a second portion BWtuner2 704 of the broad frequency spectrum 608. The second portion 704 contains a second plurality of RF channels 706 including a second number of desired channels. In the exemplary illustration of FIG. 6, the second portion 704 has a frequency bandwidth of BWtuner2 that contains desired channels 707 having respective channel frequencies $f_{rf3}$ and $f_{rf4}$. Tuner2 720 includes elements such as mixers M3 711, M4 721, amplifiers V3 714, V4 724, filters F3 715, F4 725 and analog-to-digital converters ADC3 731 and ADC4 741 that are substantially the same as the like-named elements of the signal path of tuner1 610. Thus, redundant description is omitted herein.

Digital in-phase signal Id2 731 and digital quadrature signal Qd2 741 are then provided to digital front end 740. Digital front end 740 includes a bank of L complex filters, where L is an integer value equal to the number of desired channels in the second portion BWtuner2 704 of the broad frequency spectrum 608. Each one of the bank of L complex filters is a digital complex mixer configured to transform the signals Id2 731 and Qd2 741 to baseband signals that are further filtered by individual digital low-pass filters such as FIR filters before decimated by a subsequent decimator. The elements of digital front end 740 are substantially similar to those described in digital front end 630. Thus, redundant description is omitted herein.

The decimated baseband I and Q channels are further provided to a subsequent up-conversion module 760 that performs a function substantially similar to that of the up-conversion module 650 already described above. The outputs of up-conversion module 650 and 760 can be tiled to generate a contiguous set of IF frequencies 682, 684 centered at $f_{if}$ 686. In an embodiment, the outputs of up-conversion module 650 and 760 are digitally summed and converted to an analog signal by summing DAC 670. In another embodiment, the up-conversion modules 650 and 760 and the digital summing function 672 can be performed using an inverse discrete Fourier transform or an inverse Fast Fourier transform operation.

The multi-tuner architecture provides the flexibility that multiple commercially available tuners can be used without the need of designing a wideband tuner. For example, a tuner designed for a terrestrial broadcast digital TV can be used together with a tuner dedicated to receiving a cable signal and/or a tuner for receiving a satellite broadcast signal. The multi-tuner receiver system provides an additional advantage that other tuners can be added quickly to the system to accommodate any future applications. Additionally, the multi-tuner architecture allows the use of slower speed (i.e., lower cost) analog-to-digital converters with a larger number of bits for achieving large dynamic range.

Figure 7:
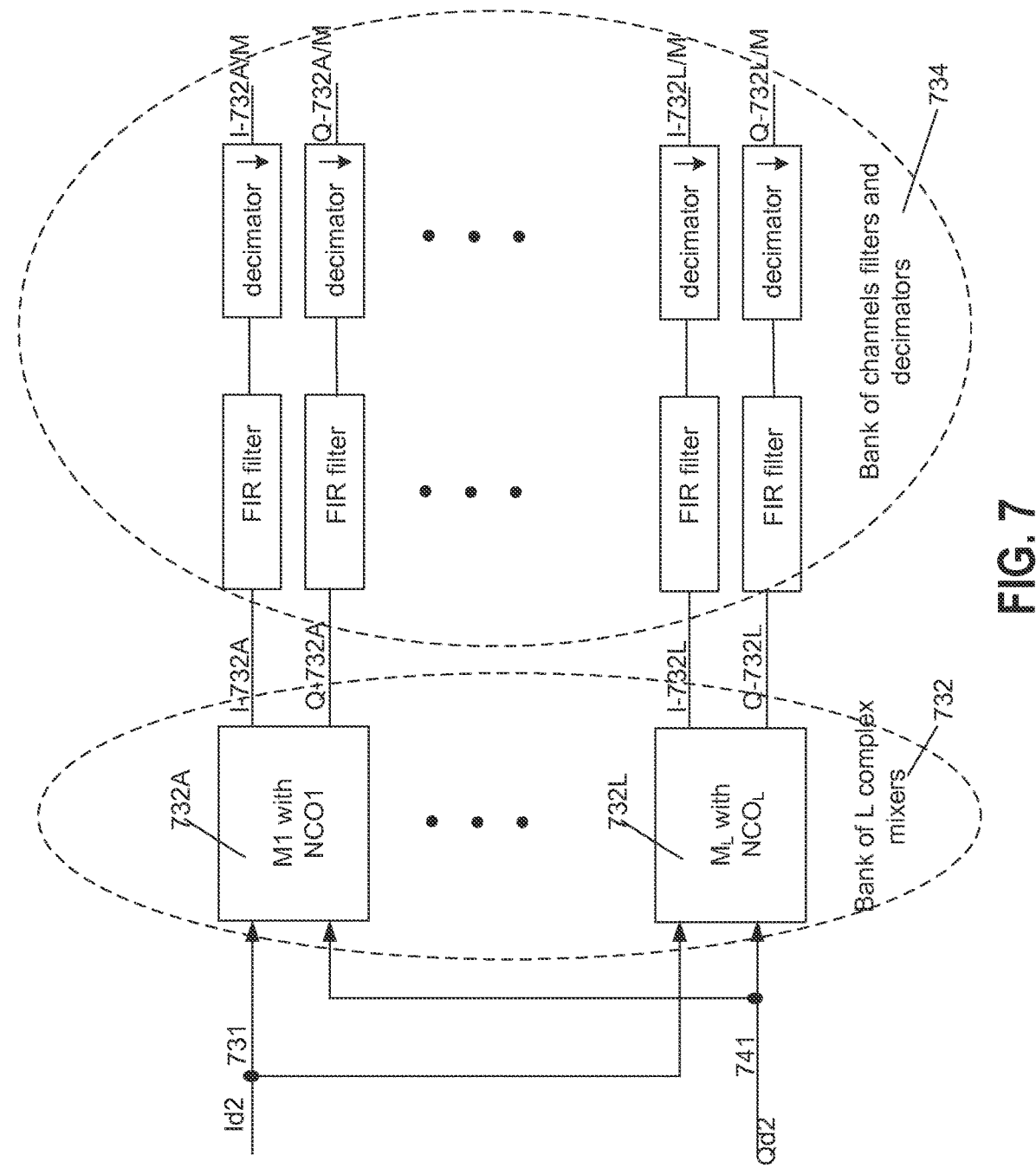
FIG. 7 is a block diagram illustrating an exemplary digital front end according to an embodiment of the present invention in more detail.

FIG. 7 shows a block diagram of an exemplary digital front end of the invention in more detail. In an embodiment, in-phase signal Id2 731 and quadrature signal Qd2 741 at the output of respective ADC converters 718 and 728 are provided to each of the L complex mixers 732 comprising mixers 732A to 732L. A more detailed description of each of L complex mixers is shown in FIG. 3. Mixer 732A multiplies Id2 731 and Qd2 741 with a cosine signal and a sine signal that are generated from an NCO1 and produces an I-732A signal and a Q-732A signal that are further individually filtered by an FIR filter before decimating. The bank of L complex mixers corresponds to the block 732 in FIG. 6; and the set of FIR filters and decimator corresponds to the block 734 in FIG. 6. Each decimated pair of I-732*i*/M in the baseband, where the index "i" is from A to L, is further provided to a subsequent up-mixer for frequency-shifting to an intermediate frequency as shown in FIG. 8.

Figure 8:
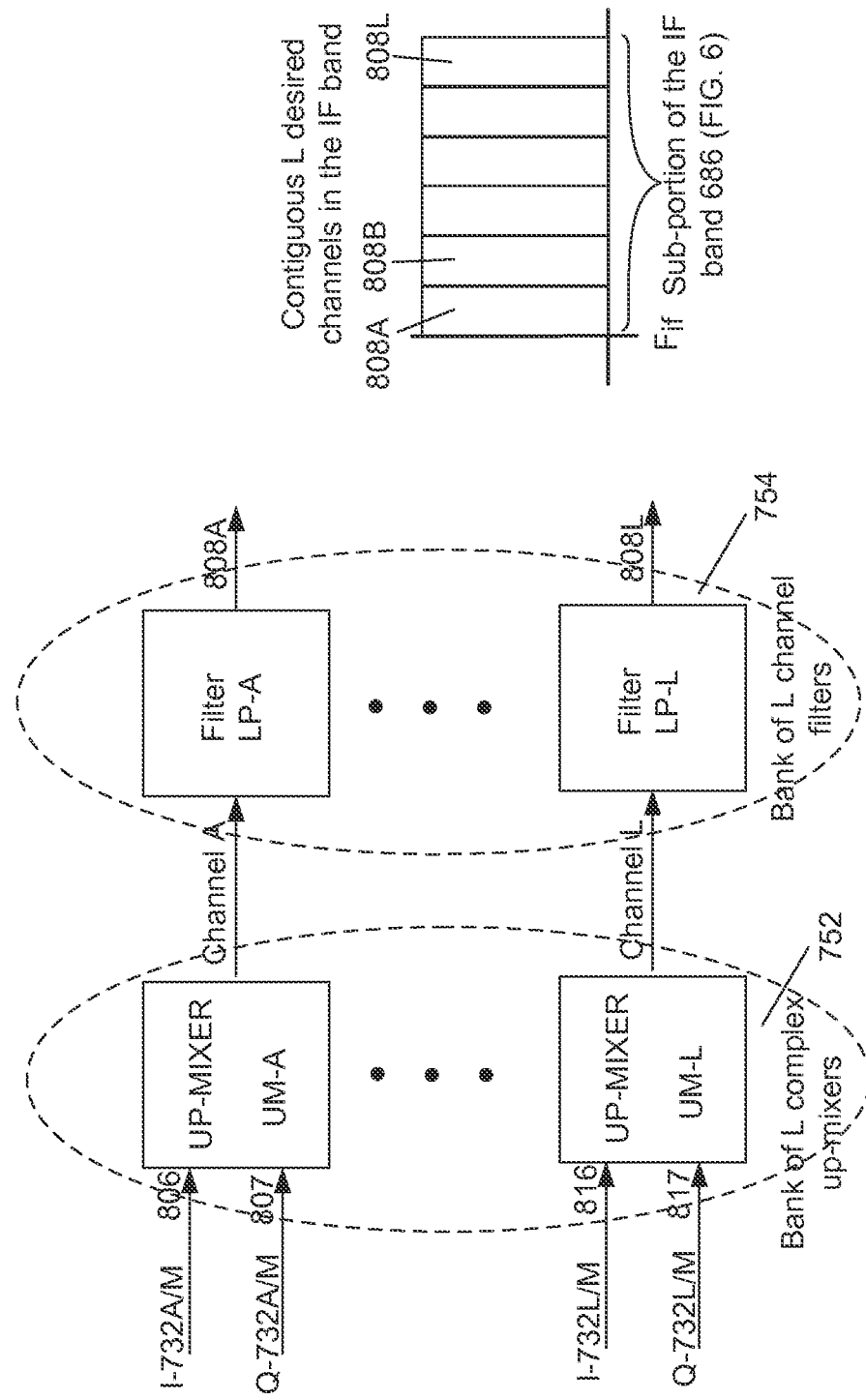
FIG. 8 is a block diagram illustrating an exemplary tiled up-converter module according to an embodiment of the present invention in more detail.

FIG. 8 shows an exemplary embodiment of a bank of L complex up-mixers according to the present invention. Each decimated pair of complex signals I-732*i*/M and Q-732*i*/M is provided to an associated complex up-mixer, whose frequency is so chosen that when mixing with the pair of complex signals I-732*i*/M and Q-732*i*/M will generate an associated channel at a predetermined sub-portion of the intermediate frequency band 686 (FIG. 6). A more detailed schematic block of one of the L up-mixers is described above together with FIG. 5.

Figure 9:
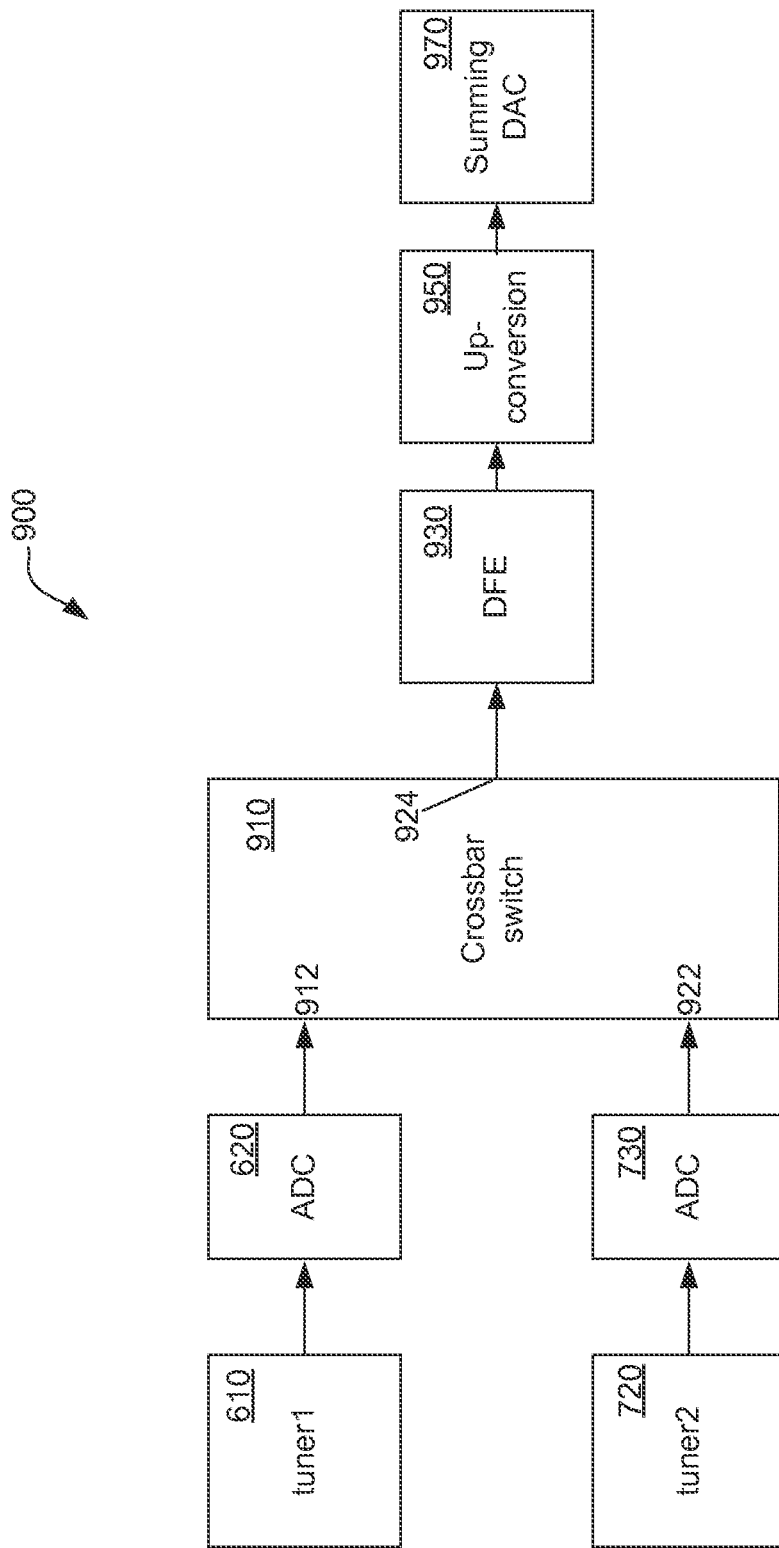
FIG. 9 is a simplified block diagram of a wideband multi-tuner receiver system 900 according to an embodiment of the present invention.

FIG. 9 is a simplified block diagram of a wideband multi-tuner receiver system 900 according to an embodiment of the present invention. In an embodiment, system 900 includes a crossbar switch 910 having at least an input terminal 912 configured to receive signals from an analog-to-digital converter (ADC) 912 and an input terminal 922 configured to receive signals from an ADC 922. Crossbar switch 910 also includes an output terminal 924 that is coupled to a digital front end 930. In an embodiment, input terminals 912 and 922 of crossbar switch 910 have P inputs, where P is an integer value that is equal to the total number of desired channels received by tuner1 610 and tuner2 720. Output terminal 924 of crossbar switch 910 have Q outputs, where Q is an integer value that is equal to the total number of desired channels received by tuner1 610 and tuner2 720.

In an embodiment, digital front end 930 may include a bank of R complex mixers that frequency shifts the received channels to a baseband. Digital front end 930 may combine digital front end 630 and 740 shown in FIG. 6. Similarly, a tiled up-conversion module 950 may include up-converter modules 650 and 760 of FIG. 6.

System 900 further includes a summing DAC that operates similarly as summing DAC 470 and 670 that have been described in detail in relation with respective FIG. 4 and FIG. 6 above. Thus, redundant description is omitted herein.

Figure 10:
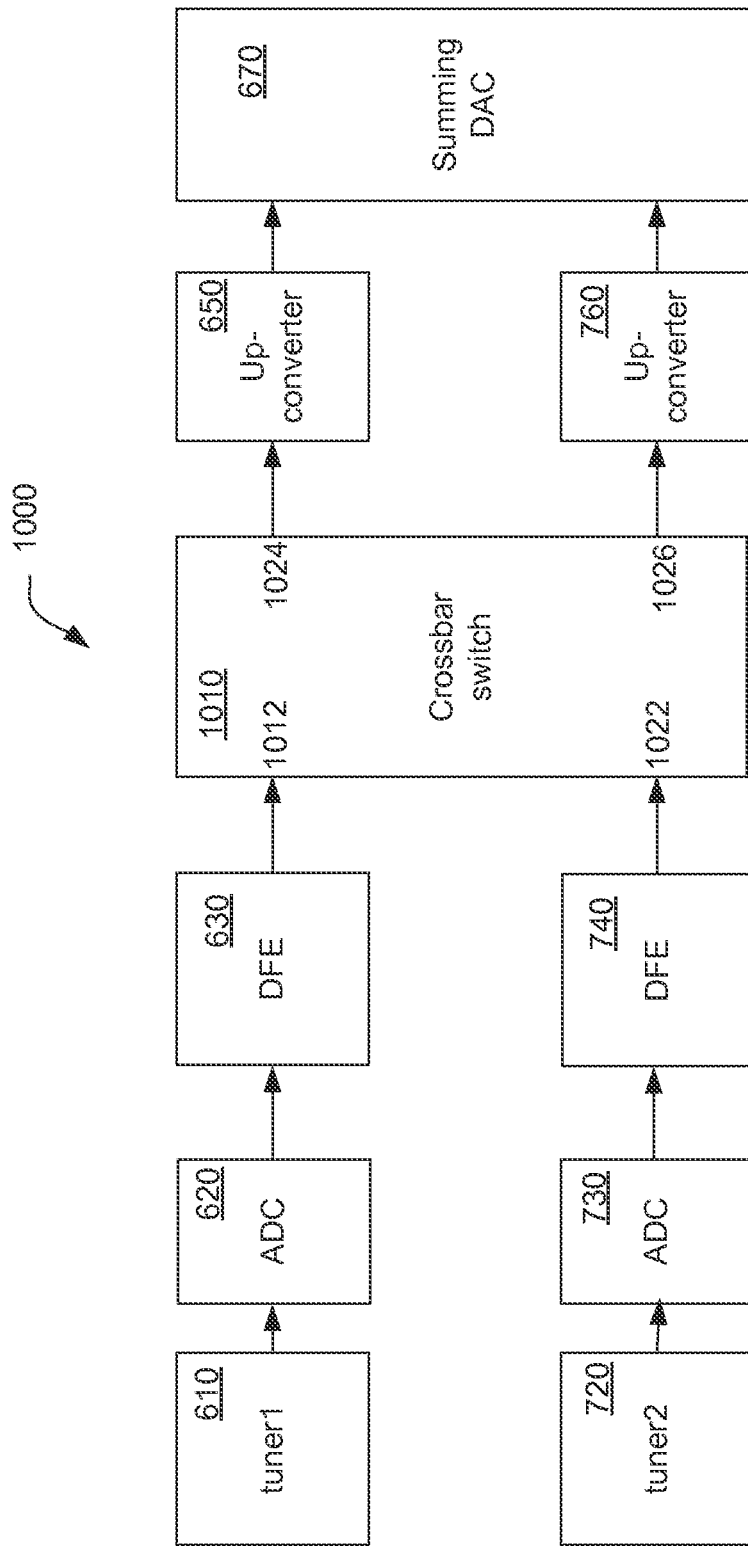
FIG. 10 is a simplified block diagram of a wideband multi-tuner receiver system 1000 according to another embodiment of the present invention.

FIG. 10 is a simplified block diagram of a wideband multi-tuner receiver system 1000 according to another embodiment of the present invention. System 1000 includes at least tuner1 610 coupled with digital front end 630 through an analog-to-digital converter 620 and tuner2 720 coupled with digital front end 740 through an analog-to-digital converter 730. System 1000 further includes a crossbar switch 1010 that is interposed between digital front ends 630, 740 and up-conversion modules 650, 760. Crossbar switch 1010 includes an input terminal 1012 having S inputs coupled with DFE 630 and an input terminal 1022 having T inputs coupled with DFE 740. In an embodiment, S is an integer value equal to the number of desired channels processed in DFE 630 and T is an integer value equal to the number of desired channels processed in DFE 740. Crossbar switch 1010 further includes an output terminal 1024 having U outputs coupled with up-converter module 650 and an output terminal 1024 having V outputs coupled with up-converter module 760. In an embodiment, the total number of the outputs U and V is equal to the sum of the inputs S and T. Thus, crossbar switch 1010 allows the routing of any channel from either DFE 630 or DFE 740 to up-converters 650 or 760. It is understood that system 1000 is not as flexible as system 900 because DFE 630 and DFE 740 are already pre-assigned to respective tuner1 (610) and tuner2 (720). However, this pre-assigned arrangement allows a simpler implementation of crossbar switch 1010 that operates at lower speeds.

While several embodiments in accordance with the present invention have been described, it is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for receiving a television (TV) signal comprising:
   receiving an input signal from a cable network;
   digitizing a contiguous band of frequencies in the input signal via a wideband analog-to-digital converter (ADC), wherein the contiguous band of frequencies comprises all received channels that exist in the input signal and the received channels comprise a plurality of desired channels and a plurality of undesired channels;
   concurrently selecting each of the plurality of desired channels from the input signal without selecting any of the plurality of undesired channels; and
   providing the plurality of desired channels via a serial interface.

2. The method of claim 1, wherein the method comprises:
   communicating the input signal from a cable network connector to the wideband ADC via at least one of an analog amplifier and an analog filter.

3. The method of claim 1, wherein the method comprises: generating, via each mixer of a plurality of mixers, a complex signal corresponding to each of the plurality of desired channels, and wherein each corresponding complex signal comprises an in-phase (I) component and a quadrature (Q) component.

4. The method of claim 3, wherein:
   the I and Q components of each corresponding complex signal are at baseband.

5. The method of claim 3, wherein the method comprises:
   filtering, via each filter of a plurality of filters, the corresponding complex signal, and wherein each corresponding complex signal comprises a 6 MHz channel.

6. The method of claim 3, wherein the method comprises:
   demodulating, via each demodulator of a plurality of demodulators, the corresponding complex signal to generate a demodulated signal as a desired channel output.

7. The method of claim 1, wherein the method comprises: demodulating, via each demodulator of a plurality of demodulators, a desired channel, of the plurality of desired channels.

8. The method of claim 7, wherein the method comprises: providing a plurality of demodulated desired channels via a parallel interface.

9. The method of claim 1, wherein:
   the plurality of desired channels comprises at least one cable broadcast channel.

10. The method of claim 1, wherein:
    the plurality of desired channels comprises at least one channel delivered via a Data Over Cable Service Interface Specification (DOCSIS) protocol.

11. The method of claim 1, wherein:
    the method is performed by a device comprising a digital video recorder (DVR).

12. The method of claim 1, wherein the method comprises:
configuring at least some of the plurality of desired channels as an output for a picture-in-picture display.

13. A method comprising:
receiving an input signal from a cable network;
digitizing all received channels in the input signal via a wideband analog-to-digital converter (ADC), wherein the received channels comprise a plurality of desired channels and a plurality of undesired channels;
digitally down converting each desired channel, of the plurality of desired channels, to generate a plurality of digital channel outputs; and
providing the plurality of digital channel outputs via a serial interface.

14. The method of claim 13, wherein the method comprises: communicating the input signal from a cable network connector to the wideband ADC via at least one of an analog amplifier and an analog filter.

15. The method of claim 13, wherein:
digitally down converting comprises generating a corresponding complex signal for each of the plurality of desired channels, and wherein each corresponding complex signal comprises an in-phase (I) component and a quadrature (Q) component.

16. The method of claim 15, wherein:
the I and Q components of each corresponding complex signal are at baseband.

17. The method of claim 15, wherein the method comprises:
a filtering the corresponding complex signal, wherein a bandwidth of the complex signal is 6 MHz.

18. The method of claim 15, wherein the method comprises: demodulating the corresponding complex signal to provide a demodulated channel as a digital channel output.

19. The method of claim 13, wherein the method comprises: demodulating each digitally down converted, desired channel to generate a plurality of demodulated channels.

20. The method of claim 19, wherein the method comprises: providing the plurality of demodulated channels via a parallel interface.

21. The method of claim 13, wherein:
the plurality of desired channels comprises at least one cable broadcast channel.

22. The method of claim 13, wherein:
the plurality of desired channels comprises at least one channel delivered via a Data Over Cable Service Interface Specification (DOCSIS) protocol.

23. The method of claim 13, wherein:
the method is performed by a device comprising a digital video recorder (DVR).

24. The method of claim 13, wherein the method comprises: providing a picture-in-picture display signal according to the plurality of digital channel outputs.

25. A method for receiving a television (TV) signal comprising:
receiving an input signal from a cable network;
digitizing a contiguous band of frequencies in the input signal via a wideband analog-to-digital converter (ADC), wherein the contiguous band of frequencies comprises all received channels that exist in the input signal and the received channels comprise a plurality of desired channels and a plurality of undesired channels;
concurrently selecting each of the plurality of desired channels from the input signal without selecting any of the plurality of undesired channels; and
providing the plurality of desired channels,
wherein the method is performed by a device comprising a digital video recorder (DVR).

26. The method of claim 25, wherein the method comprises:
communicating the input signal from a cable network connector to the wideband ADC via at least one of an analog amplifier and an analog filter.

27. The method of claim 25, wherein the method comprises:
generating, via each mixer of a plurality of mixers, a complex signal corresponding to each of the plurality of desired channels, and wherein each corresponding complex signal comprises an in-phase (I) component and a quadrature (Q) component.

28. The method of claim 27, wherein:
the I and Q components of each corresponding complex signal are at baseband.

29. The method of claim 27, wherein the method comprises:
filtering, via each filter of a plurality of filters, the corresponding complex signal, and wherein each corresponding complex signal comprises a 6 MHz channel.

30. The method of claim 27, wherein the method comprises:
demodulating, via each demodulator of a plurality of demodulators, the corresponding complex signal to generate a demodulated signal as a desired channel output.

31. The method of claim 25, wherein the method comprises:
demodulating, via each demodulator of a plurality of demodulators, a desired channel, of the plurality of desired channels.

32. The method of claim 31, wherein the method comprises: providing a plurality of demodulated desired channels via a parallel interface.

33. The method of claim 25, wherein the method comprises:
providing the plurality of desired channels via a parallel interface.

34. The method of claim 25, wherein the method comprises: providing the plurality of desired channels via a serial interface.

35. The method of claim 25, wherein:
the plurality of desired channels comprises at least one cable broadcast channel.

36. The method of claim 25, wherein:
the plurality of desired channels comprises at least one channel delivered via a Data Over Cable Service Interface Specification (DOCSIS) protocol.

37. The method of claim 25, wherein the method comprises:
configuring at least some of the plurality of desired channels as an output for a picture-in-picture display.

38. A method comprising:
receiving an input signal from a cable network;
digitizing all received channels in the input signal via a wideband analog-to-digital converter (ADC), wherein the received channels comprise a plurality of desired channels and a plurality of undesired channels; and
digitally down converting each desired channel, of the plurality of desired channels, to generate a plurality of digital channel outputs,
wherein the method is performed by a device comprising a digital video recorder (DVR).

39. The method of claim 38, wherein the method comprises:

communicating the input signal from a cable network connector to the wideband ADC via at least one of an analog amplifier and an analog filter.

40. The method of claim 38, wherein:
digitally down converting comprises generating a corresponding complex signal for each of the plurality of desired channels, and wherein each corresponding complex signal comprises an in-phase (I) component and a quadrature (Q) component.

41. The method of claim 40, wherein:
the I and Q components of each corresponding complex signal are at baseband.

42. The method of claim 40, wherein the method comprises:
a filtering the corresponding complex signal, wherein a bandwidth of the complex signal is 6 MHz.

43. The method of claim 40, wherein the method comprises:
demodulating the corresponding complex signal to provide a demodulated channel as a digital channel output.

44. The method of claim 38, wherein the method comprises:
demodulating each digitally down converted, desired channel to generate a plurality of demodulated channels.

45. The method of claim 44, wherein the method comprises:
providing the plurality of demodulated channels via a parallel interface.

46. The method of claim 38, wherein the method comprises: providing the plurality of digital channel outputs via a parallel interface.

47. The method of claim 38, wherein the method comprises: providing the plurality of digital channel outputs via a serial interface.

48. The method of claim 38, wherein:
the plurality of desired channels comprises at least one cable broadcast channel.

49. The method of claim 38, wherein:
the plurality of desired channels comprises at least one channel delivered via a Data Over Cable Service Interface Specification (DOCSIS) protocol.

50. The method of claim 38, wherein the method comprises:
providing a picture-in-picture display signal according to the plurality of digital channel outputs.

51. A method for receiving a television (TV) signal comprising:
receiving an input signal from a cable network;
digitizing a contiguous band of frequencies in the input signal via a wideband analog-to-digital converter (ADC), wherein the contiguous band of frequencies comprises all received channels that exist in the input signal and the received channels comprise a plurality of desired channels and a plurality of undesired channels;
concurrently selecting each of the plurality of desired channels from the input signal without selecting any of the plurality of undesired channels;
providing the plurality of desired channels; and
configuring at least some of the plurality of desired channels as an output for a picture-in-picture display.

52. The method of claim 51, wherein the method comprises:
communicating the input signal from a cable network connector to the wideband ADC via at least one of an analog amplifier and an analog filter.

53. The method of claim 51, wherein the method comprises:
generating, via each mixer of a plurality of mixers, a complex signal corresponding to each of the plurality of desired channels, and wherein each corresponding complex signal comprises an in-phase (I) component and a quadrature (Q) component.

54. The method of claim 53, wherein:
the I and Q components of each corresponding complex signal are at baseband.

55. The method of claim 53, wherein the method comprises:
filtering, via each filter of a plurality of filters, the corresponding complex signal, and wherein each corresponding complex signal comprises a 6 MHz channel.

56. The method of claim 53, wherein the method comprises:
demodulating, via each demodulator of a plurality of demodulators, the corresponding complex signal to generate a demodulated signal as a desired channel output.

57. The method of claim 51, wherein the method comprises:
demodulating, via each demodulator of a plurality of demodulators, a desired channel, of the plurality of desired channels.

58. The method of claim 57, wherein the method comprises: providing a plurality of demodulated desired channels via a parallel interface.

59. The method of claim 51, wherein the method comprises: providing the plurality of desired channels via a parallel interface.

60. The method of claim 51, wherein the method comprises: providing the plurality of desired channels via a serial interface.

61. The method of claim 51, wherein:
the plurality of desired channels comprises at least one cable broadcast channel.

62. The method of claim 51, wherein:
the plurality of desired channels comprises at least one channel delivered via a Data Over Cable Service Interface Specification (DOCSIS) protocol.

63. The method of claim 51, wherein:
the method is performed by a device comprising a digital video recorder (DVR).

64. A method comprising:
receiving an input signal from a cable network;
digitizing all received channels in the input signal via a wideband analog-to-digital converter (ADC), wherein the received channels comprise a plurality of desired channels and a plurality of undesired channels;
digitally down converting each desired channel, of the plurality of desired channels, to generate a plurality of digital channel outputs; and
configuring at least some of the plurality of desired channels as an output for a picture-in-picture display.

65. The method of claim 64, wherein the method comprises:
communicating the input signal from a cable network connector to the wideband ADC via at least one of an analog amplifier and an analog filter.

66. The method of claim 64, wherein:
digitally down converting comprises generating a corresponding complex signal for each of the plurality of desired channels, and wherein each corresponding complex signal comprises an in-phase (I) component and a quadrature (Q) component.

67. The method of claim 66, wherein:
the I and Q components of each corresponding complex signal are at baseband.

68. The method of claim 66, wherein the method comprises:
a filtering the corresponding complex signal, wherein a bandwidth of the complex signal is 6 MHz.

69. The method of claim 66, wherein the method comprises:
demodulating the corresponding complex signal to provide a demodulated channel as a digital channel output.

70. The method of claim 64, wherein the method comprises:
demodulating each digitally down converted, desired channel to generate a plurality of demodulated channels.

71. The method of claim 70, wherein the method comprises: providing the plurality of demodulated channels via a parallel interface.

72. The method of claim 64, wherein the method comprises: providing the plurality of digital channel outputs via a parallel interface.

73. The method of claim 64, wherein the method comprises: providing the plurality of digital channel outputs via a serial interface.

74. The method of claim 64, wherein:
the plurality of desired channels comprises at least one cable broadcast channel.

75. The method of claim 64, wherein:
the plurality of desired channels comprises at least one channel delivered via a Data Over Cable Service Interface Specification (DOCSIS) protocol.

76. The method of claim 64, wherein:
the method is performed by a device comprising a digital video recorder (DVR).

* * * * *